ns,096,346
Patented July 2, 1963

3,096,346
OXIDATION OF MANOYL OXIDE
Jesse A. Giles and Sam S. Mims, Winston-Salem, N.C., assignors to R. J. Reynolds Tobacco Company, Winston-Salem, N.C., a corporation of New Jersey
No Drawing. Filed Sept. 11, 1961, Ser. No. 137,022
7 Claims. (Cl. 260—343.3)

This invention relates to oxidation and has for an object the provision of a process for producing decahydro-3a,6,6,9a-tetramethylnaphtho[2,1-b]furan-2(1H)-one.

As is known in the art, the compound decahydro-3a,6,6,9a-tetramethylnaphtho[2,1-b]furan-2(1H)-one (Compound I) is particularly useful for incorporation into domestic tobaccos in order to enhance the odor and flavor of the tobacco smoke. Compound I has the following structural formula:

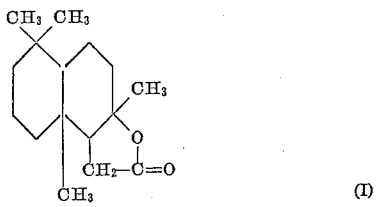

(I)

It has now been found that Compound I can be produced in good yields by the oxidation under prescribed conditions of manoyl oxide. Thus, the present invention provides a process for oxidizing manoyl oxide to produce Compound I whereby high yields of Compound I are obtainable.

In accordance with the present invention manoyl oxide is oxidized in one step utilizing an alkali or alkaline earth metal permanganate oxidizing agent. The oxidation reaction is carried out under acidic conditions preferably at an elevated temperature of from about 35 to 60° C., and most preferably at a temperature from 45 to 55° C. The metal permanganate oxidizing agent is preferably employed in an amount from about 5 to 8 moles of oxidizing agent per mole of manoyl oxide.

Any suitable non-oxidizing organic acid or aqueous organic acid solution can be used as the menstruum for carrying out the oxidation reaction. Acetic acid and aqueous acetic acid solutions can be advantageously employed to provide the acid conditions for the oxidation reaction. More efficient agitation of the reaction mixture is generally necessary to avoid slight reductions in yield when an aqueous organic acid solution is employed as the reaction medium.

Sodium and potassium permanganate are preferred oxidizing agents for use in the invention but other salts of permanganic acid can be used, such as calcium, magnesium or other salt-forming cations.

The manoyl oxide employed as the starting material in the oxidation process of the present invention includes both the epimeric oxides, manoyl oxide (A) and 13-epimanoyl oxide (B) having the structures:

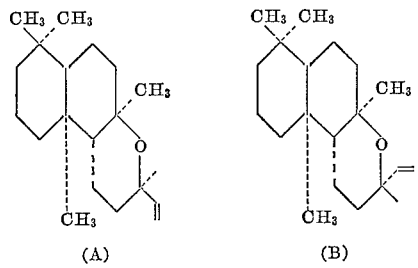

(A)           (B)

The following examples illustrate the preparation of Compound I by the one step oxidation of manoyl oxide according to the present invention.

EXAMPLE I

A mixture of 25 grams of manoyl oxide (.086 mole), 500 milliliters of acetic acid, and 5 grams of sodium acetate is slurried and warmed to a temperature of about 50° C. To this mixture 75 grams (0.47 mole) of potassium permanganate is added in small portions over a period of about 3 hours. The reaction mixture is agitated vigorously during the addition. Agitation is continued for an additional 2 to 4 hours at the same temperature to complete the reaction.

To this mixture 75 grams of potassium bisulfite is slowly added while maintaining the mixture at a temperature of between 20 and 25° C. to generate sufficient sulfur dioxide so as to convert the precipitated manganese dioxide to the water soluble manganese sulfate. Prior to the addition of the potassium bisulfite, 200 milliliters of 2 N sulfuric acid is added to facilitate the generation of sulfur dioxide. The mixture is then diluted in 3000 milliliters of water and the precipitated product filtered.

The solid product at this stage comprises a mixture principally of Compound I and a substantial amount of an acetoxy acid, 2-acetoxy-2,5,5,8a-tetramethyldecahydronapthalene acetic acid having the structure:

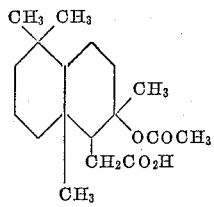

The solid product is dissolved in 300 milliliters of methanol and then 30 milliliters of water and 40 grams of potassium hydroxide are added to hydrolyze or saponify the organic product which is done under reflux for 3 hours. The methanol is removed at reduced pressure. The residue from the distillation is dissolved in 400 milliliters of water and washed with two 300-milliliter portions of hexane. The washed aqueous layer is then acidified with 300 milliliters of 7 N sulfuric acid to a pH of 2. The hydroxy acid (2-hydroxy-2,5,5,8a-tetramethyldecahydronaphthalene acetic acid) which precipitates has the formula

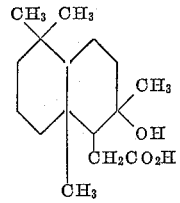

and is isolated by filtration. The solid is dried in the air and is then heated at 135 to 145° C. for 1.5 to 2 hours to convert it to the desired lactone product (Compound I). The lactone (Compound I) product having a melting point of 123° C.–124° C. is purified by crystallization from hexane. The yield of acid-free product (Compound I) by this process depends to large extent on the temperature of the oxidation reaction. When the oxidation reaction is carried out at about 50° C. the yield of Compound I is about 65–70 percent based on the starting manoyl oxide.

EXAMPLE II

Following the procedure of Example I, a number of oxidation runs were carried out wherein the oxidation temperature was varied. The effect of oxidation temperature on yield of the desired Compound I is shown below:

*Table I*

| Oxidation temperature ° C.: | Percent yield acid-free Compound I |
|---|---|
| 25 | 25.5 |
| 35 | 39.8 |
| 45 | 62.4 |
| 55 | 61.1 |
| 65 | 46.8 |

EXAMPLE III

The oxidation of manoyl oxide was carried out essentially as in Example I except that an aqueous acetic acid solution was employed as the reaction medium. Also the crude product, after saponifying, acidifying and dehydrating, was isolated by dissolving it in hexane and filtering through a bed of celite. The filtrate was then washed with two 300-milliliter portions of 3 percent aqueous potassium carbonate. The hexane solution was then concentrated. Three runs utilizing this procedure gave yields of 71 percent (96.3% pure), 69.4 percent (93.3% pure) and 59.0 percent (95.6% pure).

Those modifications and equivalents which fall within the spirit of the invention and the scope of the appended claims are to be considered part of the invention.

We claim:

1. A process of preparing the compound decahydro-3a,6,6,9a-tetramethylnaphtho[2,1-b]furan-2(1H)-one which comprises contacting under oxidizing conditions in the presence of a non-oxidizing organic acid dispersing medium manoyl oxide and an oxidizing agent selected from the group consisting of the alkali metal and alkaline earth metal permanganates, said oxidizing agent being present in an amount whereby the desired oxidation is completed, and thereafter recovering the said compound.

2. A process of preparing the compound decahydro-3a,6,6,9a-tetramethylnaphtho[2,1-b]furan-2(1H)-one which comprises contacting under oxidizing conditions manoyl oxide and an oxidizing agent selected from the group consisting of the alkali metal and alkaline earth metal permanganates, said contact being carried out at a temperature from about 35° C. to 60° C. in the presence of a non-oxidizing organic acid dispersing medium, said oxidizing agent being present in an amount whereby the desired oxidation is completed and thereafter recovering the said compound.

3. A process of preparing the compound decahydro-3a,6,6,9a-tetramethylnaphtho[2,1-b]furan-2(1H)-one which comprises contacting under oxidizing conditions in the presence of a non-oxidizing organic acid dispersing medium manoyl oxide and an oxidizing agent selected from the group consisting of the alkali metal and alkaline earth metal permanganates, the said oxidizing agent being present in an amount whereby the desired oxidation is completed, and thereafter successively saponifying, acidifying and dehydrating the oxidation product to recoover said compound.

4. The process of claim 3 wherein the oxidation is carried out in the presence of acetic acid as a dispersing medium.

5. A process of preparing the compound decahydro-3a,6,6,9a-tetramethylnaphtho[2,1-b]furan-2(1H)-one which comprises contacting under oxidizing conditions manoyl oxide and an alkali metal permanganate at a temperature from about 45° C. to 55° C. in the presence of acetic acid as a dispersing medium, the said alkali metal permanganate being present in an amount whereby the desired oxidation is completed, and thereafter successively saponifying, acidifying and dehydrating the oxidation product to recover said compound.

6. A process of preparing the compound decahydro-3a,6,6,9a-tetramethylnaphtho[2,1-b]furan-2(1H)-one which comprises contacting under oxidizing conditions in the presence of a non-oxidizing organic acid dispersing medium manoyl oxide and an oxidizing agent selected from the group consisting of the alkali and alkaline earth metal permanganates, said oxidizing agent being present in an amount whereby the desired oxidation is completed, separating a solid mixture of said compound and an intermediate 2-acetoxy-2,5,5,8a-tetramethyldecahydronaphthaleneacetic acid from the reaction medium and thereafter subjecting the last mentioned mixture successively to saponification, acidifying and dehydrating conditions whereby to form said compound.

7. A process of preparing the compound decahydro-3a,6,6,9a-tetramethylnaphthano[2,1-b]furan-2(1H)-one which comprises contacting under oxidizing conditions in the presence of a non-oxidizing organic acid dispersing medium an aqueous dispersion of manoyl oxide and an oxidizing agent selected from the group consisting of the alkali metal and alkaline earth metal permanganates, the said oxidizing agent being present in an amount whereby the desired oxidation is completed, further acidifying the resulting aqueous reaction mixture whereby a solid comprising manganese dioxide, said compound and an intermediate 2-acetoxy-2,5,5,8a-tetramethyldecahydronaphthaleneacetic acid is dispersed in the mixture, treating the aqueous mixture with a sulfur compound to convert the manganese dioxide to the water soluble salts of manganese, separating the remainder of said solid from the sulfur compound treated mixture, and subjecting the separated substances successively to saponification, acidifying and dehydrating conditions whereby to form said compound.

References Cited in the file of this patent

UNITED STATES PATENTS

| 2,809,996 | Stoll | Oct. 15, 1957 |
| 2,914,565 | Ohloff | Nov. 24, 1959 |

OTHER REFERENCES

Simonsen: The Terpenes, Cambridge Univ. Press, vol. III (1952), pages 362–364.